United States Patent
Vemuri et al.

(10) Patent No.: US 7,930,583 B1
(45) Date of Patent: Apr. 19, 2011

(54) SYSTEM AND METHOD FOR DOMAIN FAILURE ANALYSIS OF A STORAGE AREA NETWORK

(75) Inventors: Hari Krishna Vemuri, Pune (IN);
Venkata Sreenivasa Rao Nagineni, Pune (IN); Siddhartha Nandi, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 331 days.

(21) Appl. No.: 11/521,039

(22) Filed: Sep. 14, 2006

(51) Int. Cl.
*G06F 11/00* (2006.01)

(52) U.S. Cl. ............. 714/4; 714/43; 709/223; 709/224; 710/316

(58) Field of Classification Search ............... 714/4, 43, 714/48, 39; 710/316; 709/220, 221, 223, 709/224
See application file for complete search history.

(56) References Cited

U.S. PATENT DOCUMENTS

| | | | | |
|---|---|---|---|---|
| 6,606,695 | B2 * | 8/2003 | Kamano et al. | 711/163 |
| 7,194,538 | B1 * | 3/2007 | Rabe et al. | 709/224 |
| 7,307,948 | B2 * | 12/2007 | Infante et al. | 370/225 |
| 2003/0055932 | A1 * | 3/2003 | Brisse | 709/223 |
| 2004/0024852 | A1 | 2/2004 | Chen et al. | 709/220 |
| 2004/0024855 | A1 | 2/2004 | Tsai et al. | 709/223 |
| 2004/0059807 | A1 * | 3/2004 | Klotz et al. | 709/223 |
| 2005/0111378 | A1 | 5/2005 | Chen et al. | 370/252 |

OTHER PUBLICATIONS

Cisco Systems, "Using the Cisco SPAN Port for SAN Analysis," Jun. 2005, pp. 1-11.
International Business Machines Corporation, "Concepts, Planning, and Installation Guide ," Version 2.2, Second Edition, Jul. 2004, pp. 1-114.
Sanrad, "Total iSCSI SAN V-Switch 2000," Dec. 2003, pp. 1-4.
Sun Microsystems, "Sun StorEdge™ Traffic Manager 4.6 Software User's Guide," Sep. 2004, pp. 1-64.
TWG Proposal Document of the Fibre Channel, "Common HBA API," Version 2.18, Mar. 1, 2002, pp. 1-91.

* cited by examiner

*Primary Examiner* — Yolanda L Wilson
(74) *Attorney, Agent, or Firm* — Campbell Stephenson LLP

(57) ABSTRACT

Systems, methods, apparatus and software can implement a SAN monitoring scheme for determining changes in SAN topology, such as device failure and state changes. These changes are recorded in a SAN topology data structure. Information in the SAN topology data structure is used, for example, to identify a suspect path or set of paths, and to make decisions about communications pathways used by a multipath device driver.

33 Claims, 6 Drawing Sheets

SYSTEM AND METHOD FOR DOMAIN FAILURE ANALYSIS OF A STORAGE AREA NETWORK

FIELD OF THE INVENTION

The present invention relates to storage devices in distributed computer systems and, more particularly, to performing failure analysis in storage area networks.

BACKGROUND OF THE INVENTION

Distributed computing systems are an increasingly important part of research, governmental, and enterprise computing systems. Among the advantages of such computing systems are their ability to handle a variety of different computing scenarios including large computational problems, high volume data processing situations, and high availability situations. Such distributed computing systems typically utilize one or more storage devices in support of the computing systems operations. These storage devices can be quite numerous and/or heterogeneous. In an effort to aggregate such storage devices and to make such storage devices more manageable and flexible, storage virtualization techniques are often used. Storage virtualization techniques establish relationships between physical storage devices, e.g. disk drives, tape drives, optical drives, etc., and virtual or logical storage devices such as volumes, virtual disks, and virtual logical units (sometimes referred to as virtual LUNs). In so doing, virtualization techniques provide system-wide features, e.g., naming, sizing, and management, better suited to the entire computing system than those features dictated by the physical characteristics of storage devices. Additionally, virtualization techniques enable and/or enhance certain computing system operations such as clustering and data backup and restore.

FIG. 1 illustrates a simplified example of a computing system 100. The members of the computing system 100 include host 130 and host 140. As members of computing system 100, hosts 130 and 140, typically some type of application, data, or file server, are often referred to "nodes." Hosts 130 and 140 can be designed to operate completely independently of each other, or may interoperate to form some manner of cluster. Thus, hosts 130 and 140 are typically individual computer systems having some or all of the software and hardware components well known to those having skill in the art. FIG. 6 (described below) illustrates some of the features common to such computer systems. In support of various applications and operations, hosts 130 and 140 can exchange data over, for example, network 120, typically a local area network (LAN), e.g., an enterprise-wide intranet, or a wide area network (WAN) such as the Internet. Additionally, network 120 provides a communication path for various client computer systems 110 to communicate with hosts 130 and 140. In addition to network 120, hosts 130 and 140 can communicate with each other over a private network (not shown).

Other elements of computing system 100 include storage area network (SAN) 150 and storage devices such as tape library 160 (typically including one or more tape drives), a group of disk drives 170 (i.e., "just a bunch of disks" or "JBOD"), and intelligent storage array 180. As shown in FIG. 1, both hosts 130 and 140 are coupled to SAN 150. SAN 150 is conventionally a high-speed network that allows the establishment of direct connections between storage devices 160, 170, and 180 and hosts 130 and 140. SAN 150 can also include one or more SAN specific devices such as SAN switches, SAN routers, SAN hubs, or some type of storage appliance. Thus, SAN 150 is shared between the hosts and allows for the sharing of storage devices between the hosts to provide greater availability and reliability of storage. Although hosts 130 and 140 are shown connected to storage devices 160, 170, and 180 through SAN 150, this need not be the case. Shared resources can be directly connected to some or all of the hosts in the computing system, and computing system 100 need not include a SAN. Alternatively, hosts 130 and 140 can be connected to multiple SANs.

FIG. 2 illustrates in greater detail several components of computing system 100. For example, disk array 180 is shown to include two input/output (I/O) ports 181 and 186. Associated with each I/O port is a respective storage controller (182 and 187), and each storage controller generally manages I/O operations to and from the storage array through the associated I/O port. In this example, each storage controller includes a processor (183 and 188), a cache memory (184 and 189) and a regular memory (185 and 190). Although one or more of each of these components is typical in disk arrays, other variations and combinations are well known in the art. The disk array also includes some number of disk drives (logical units (LUNs) 191-195) accessible by both storage controllers. As illustrated, each disk drive is shown as an LUN which is generally an indivisible unit presented by a storage device to its host(s). Logical unit numbers, also sometimes referred to as LUNs, are typically assigned to each disk drive in an array so the host can address and access the data on those devices. In some implementations, an LUN can include multiple devices, e.g., several disk drives, that are logically presented as a single device.

FIG. 2 also illustrates some of the software and hardware components present in hosts 130 and 140. Both hosts 130 and 140 execute one or more application programs (131 and 141) respectively. Such applications can include, but are not limited to, database administration systems (DBMS), file servers, application servers, web servers, backup and restore software, customer relationship management software, and the like. The applications and other software not shown, e.g., operating systems, file systems, and applications executing on client computer systems 110 can initiate or request I/O operations against storage devices such as disk array 180. Hosts 130 and 140 also execute volume manager (133 and 143) which enables physical resources configured in the computing system to be managed as logical devices. An example of software that performs some or all of the functions of volume manager 330 is the VERITAS™ Volume Manager product provided by Symantec Corporation. Hosts 130 and 140 take advantage of the fact that disk array 180 has more than one I/O port using dynamic multipathing (DMP) drivers (135 and 145) as well as multiple host bus adaptors (HBAs) 137, 139, 147, and 149. The HBAs provide a hardware interface between the host bus and the storage network, typically implemented as a Fibre Channel network. Hosts 130 and 140 each have multiple HBAs to provide redundancy and/or to take better advantage of storage devices having multiple ports.

The DMP functionality enables greater reliability and performance by using path failover and load balancing. In general, the multipathing policy used by DMP drivers 135 and 145 depends on the characteristics of the disk array in use. Active/active disk arrays (A/A arrays) permit several paths to be used concurrently for I/O operations. Such arrays enable DMP to provide greater I/O throughput by balancing the I/O load uniformly across the multiple paths to the disk devices. In the event of a loss of one connection to an array, the DMP driver automatically routes I/O operations over the other available connections to the array. Active/passive arrays in so-called auto-trespass mode (A/P arrays) allow I/O operations on a primary (active) path while a secondary (passive) path is used if the primary path fails. Failover occurs when I/O is received or sent on the secondary path. Active/passive arrays in explicit failover mode (A/PF arrays) typically require a special command to be issued to the array for failover to occur. Active/passive arrays with LUN group failover (A/PG arrays) treat a group of LUNs that are connected through a controller as a single failover entity. Failover occurs at the controller level, and not at the LUN level (as would typically be the case for an A/P array in auto-trespass mode). The primary and secondary controller are each connected to a separate group of LUNs. If a single LUN in the primary controller's LUN group fails, all LUNs in that group fail over to the secondary controller's passive LUN group.

When DMP functionality is extended to support SAN attached disks and storage arrays, certain deficiencies can arise. The proliferation of storage arrays has placed higher demand on array supportability of DMP. Maturity of multipathing support in operating systems and third-party driver software has increased the need for and complexity of DMP coexistence with these products. Moreover, use of DMP in a SAN environment significantly changes the complexity of path management. The number of devices that can be connected to a host generally increases by one or two orders of magnitude. Similarly, the number of paths to a particular device is often greater than two, the number in basic DMP implementations. Both of these factors have contributed to a significantly longer recovery time when some error condition occurs.

With the larger number of path segments and devices in a given path between an application executing on a host computer system and target storage, the overall chance of failure somewhere in the path increases. Because DMP functionality is typically one of the lowest elements in the software stack (i.e., closest to the hardware), its responsiveness is important to maintaining system-wide high availability characteristics. Accordingly, improved systems, methods, software, and devices are needed to improve the error detection, recovery, and monitoring functions of DMP functionality.

SUMMARY OF THE INVENTION

It has been discovered that systems, methods, apparatus and software can implement a SAN monitoring scheme for determining changes in SAN topology, such as device failure and state changes. These changes are recorded in a SAN topology data structure. Information in the SAN topology data structure is used, for example, to identify a suspect path or set of paths, and to make decisions about communications pathways used by a multipath device driver.

Accordingly, one aspect of the present invention provides a method. A message indicating occurrence of an event related to a change in topology of a storage area network (SAN) is received at a host bus adapter (HBA). Information from the received message is obtained from the host bus adapter. The information describes a change in a SAN device. A SAN topology data structure is updated according to the information from the received message. Information in the SAN topology data structure is used to identify a suspect path for use by a multipath device driver.

In another aspect of the present invention, a system includes a multipath driver and an event monitor in communication with the multipath driver. The multipath driver is configured to direct input/output (I/O) operations along at least one of a plurality of communication pathways to at least one storage device in a storage area network (SAN). The event monitor is configured to obtain, from a host bus adapter coupled to the SAN, information about a change in topology of the SAN. The event monitor is also configured to update a SAN topology data structure according to the information about the change in topology of the SAN. At least one of the multipath driver and the event monitor is further configured to use information in the SAN topology data structure to identify a suspect path for use by the multipath device driver.

In another aspect of the present invention, a computer readable medium comprising program includes instructions executable on a processor. The computer readable medium is one or more of an electronic storage medium, a magnetic storage medium, an optical storage medium, or a communications medium conveying signals encoding the instructions. The program instructions are operable to implement each of: obtain, from a host bus adapter, information about a change in topology of a storage area network (SAN); update a SAN topology data structure according to the information about the change in topology of the SAN; and use information in the SAN topology data structure to identify a suspect path for use by a multipath device driver.

Yet another aspect of the present invention provides an apparatus including: a means for receiving, at a host bus adapter (HBA), a message indicating occurrence of an event related to a change in topology of a storage area network (SAN); a means for obtaining, from the host bus adapter, information from the received message, wherein the information describes a change in a SAN device; a means for updating a SAN topology data structure according to the information from the received message; and a means for using information in the SAN topology data structure to identify a suspect path for use by a multipath device driver.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

The following sets forth a detailed description of at least the best contemplated mode for carrying out the one or more devices and/or processes described herein. The description is intended to be illustrative and should not be taken to be limiting.

Figure 3:
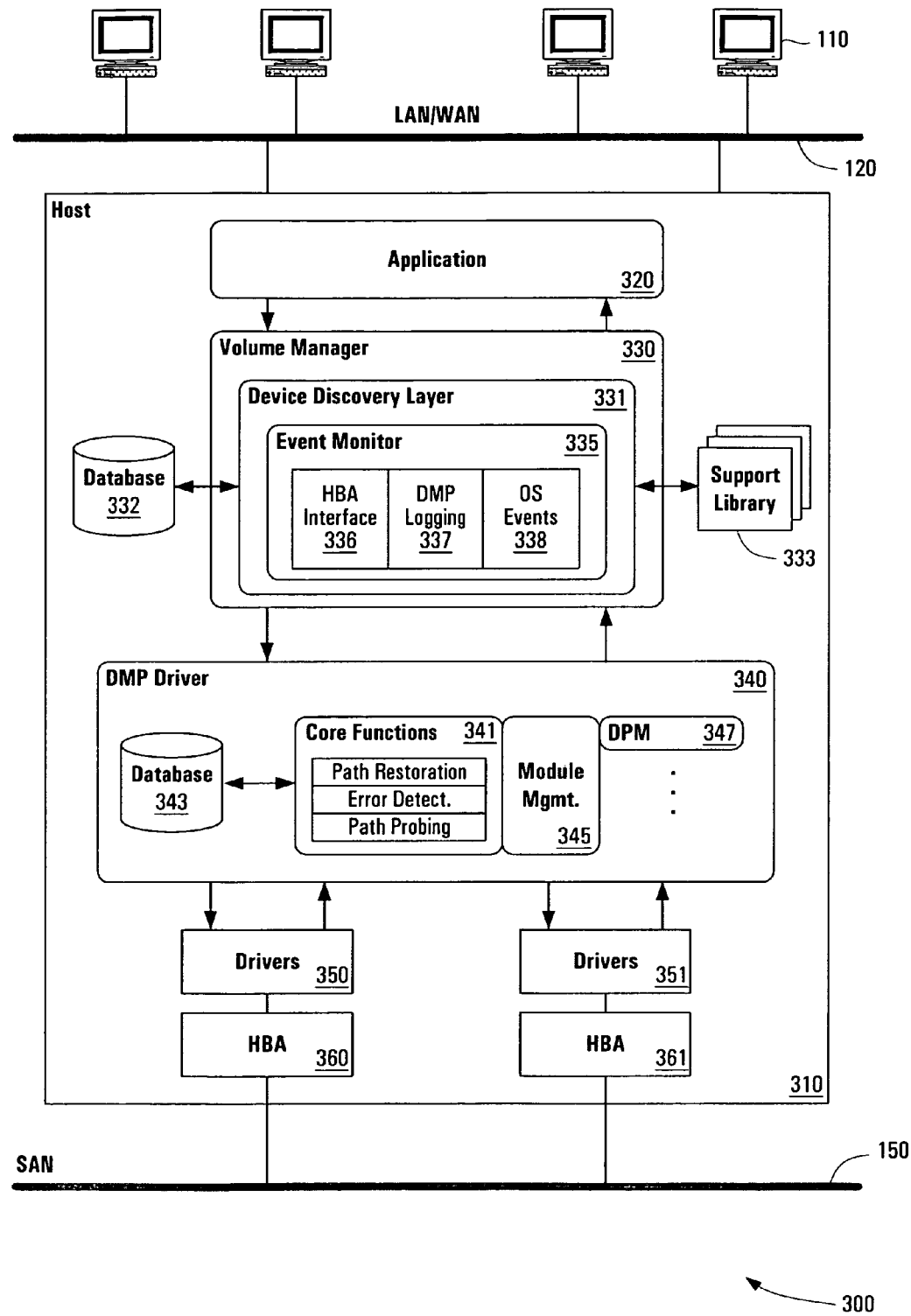
FIG. 3 is a simplified block diagram of portions of a computing system including a host computer system utilizing some of the systems and methods of the present invention.

FIG. 3 is a simplified block diagram of portions of a computing system 300 including a host computer system utilizing some of the systems and methods of the present invention. In the example illustrated, host computer system 310 includes a volume manager 330 that possesses additional functionality in device discovery layer 331. Although illustrated as part of volume manager 330, device discovery layer 331 can be a separate program, or a service available to volume manager 330, e.g., a service provided to a configuration daemon (not shown) of volume manager 330. In general, a configuration daemon corresponds to a process responsible for discovering the attributes of storage devices, such as multipath attributes of disks and disk arrays. Because host computer system 310 can in general be used with a variety of different storage devices such as disk arrays, volume manager 330 and other software components such as DMP driver 340 are designed to operate in a heterogeneous storage environment. Thus, device discovery layer 331 working alone or in conjunction with other portions of volume manager 330 and/or additional software components (not shown) is responsible for discovering various attributes of storage devices, such as multipath attributes of disks and disk arrays. Device discovery layer 331 can also be used to discover enclosure information, if available, from storage devices. Enclosure information can, for example, be used by volume manager 330 to determine an appropriate storage device in which to store certain data.

Device discovery layer 331 stores information about various storage devices in database 332. Moreover, since hardware and/or software characteristics of storage devices can differ significantly, e.g., because of differences among device manufacturers, the procedures used to discover device attributes can differ among devices. Consequently, device discovery layer 331 can use a set of device support libraries 333 that provide device information specific to the storage devices of particular vendors. In one implementation, each device support library in the set of device support libraries 333 is a storage device-specific dynamically loadable library. Thus, support for a particular type of storage device can be added or removed dynamically from without stopping volume manager 330 or rebooting host system 310. Moreover, if a disk array contains active volumes, the disk volumes can remain available during and after the addition or removal of the support.

In order to perform the device discovery function, device discovery layer 331 uses code to scan an operating system device tree in a platform-specific manner. In one embodiment, device discovery layer 331 discovers all storage devices available to host computer system 310. In yet another embodiment, partial discovery of available storage devices is achieved using constraint-based discovery. For example, a set of predefined storage device attributes can be used to constrain the discovery process to a subset of the storage devices identifies by the host operating system.

Device discovery layer 331 gathers attributes of the storage devices connected to a host and configures DMP driver 340 for a particular storage device so that volume manager 330 can access and use the device. Configuration of DMP driver 340 enables multipathing features, as described above, within corresponding storage devices.

In one embodiment, device discovery layer 331 uses SCSI commands to discover attributes of different disk arrays. Use of these commands can be hard-coded into device discovery layer 331, or it can be dictated in whole or in part by information from one or more of the device support libraries 333. The device support libraries typically include one or more functions, procedures, and/or object oriented methods for use in determining storage device attributes. Examples of the types of storage device attributes discovered by device discovery layer 331 include: vendor identification, product identification, enclosure serial number, LUN serial number, disk array type (e.g., A/A, A/P, A/PG, A/PF), and LUN ownership. Still other storage device attributes will be well known to those having ordinary skill in the art. In still another example, dynamic attributes, e.g., storage device attributes that can change between two invocations of a device discovery operation, are supported. In such a situation, a device support library 333 may declare to the device discovery layer 331 that one or more attributes are dynamic. When one of these dynamic attribute is retrieved, a function within the support library can be invoked to get the latest value of the attribute.

Some or all of the storage device attributes discovered by device discovery layer 331 are typically stored in database 332. In one embodiment, database 332 is maintained as a database of name-value pairs called a property list. The name is the property name and the value is one of the values of the associated property. This scheme allows a new property to be created with an associated value, and further allows expanding or shrinking the set of values of a particular property. Another component of database 332 can be an association list. This list maintains the association between a <property, value> tuple with another <property, value> tuple. The association list is typically used to maintain the property-values associated with various device discovery layer objects. Access to and manipulation of database 332 is typically handled through an application program interface (API) (not shown) that includes a number of functions, procedures and/or object-oriented methods designed for accessing, modifying, and manipulating data stored in database 332 such as the aforementioned property and association lists.

Device discovery module 331 is responsible for passing storage device information to DMP driver 340. For example, device discovery layer 331 can transmit a stream of opcodes and operands to DMP driver 340. DMP driver 340, and in particular core functions 341, interprets these instructions and performs a variety of operations based on the instructions such as configuring or reconfiguring its device database 343. In addition to core functionality 341 and device database 343, DMP Driver 340 can include one or more device policy modules (DPMs) 347 managed by module management 345. Device discovery layer 331 provides I/O policy configuration information to DMP driver 340 only for those storage device types or models which are applicable to the devices discovered by device discovery layer 331. For example, a support library 333 for a particular storage device may specify that the corresponding storage device can (or should) only use a particular array model (e.g., A/A, A/P, A/PG, A/PF). In response, core functions 341 will ensure that the proper I/O policy is supported by DMP driver 340. This operation might involve loading certain default I/O policy modules or routines, enabling certain default I/O policy modules or routines, and/or de-selecting certain incompatible default I/O policy modules or routines. As shown, DMP core functions 341 typically include software for path restoration (e.g., failover), error condition detection, and general path probing and analysis.

DMP driver 340 uses the storage device attributes received from device discovery layer 331 along default I/O policies to perform I/O operation scheduling, path failover, and other I/O operations (e.g. SCSI reservation) in the multipath environment of computing system 300. However, because it is not practical for the core functionality of DMP driver 340 to provide an unlimited number of different I/O policies for every possible storage device for use in computing system 300, DMP 340 supports the use of dynamically loadable DPMs to modify, augment, or replace the fixed set of procedures in storage device-specific manner. Thus, DPMs such as DPM 347 typically include one or more functions, procedures, or object oriented methods for performing various I/O operations. This functionality is typically designed to be device-specific, i.e., the some or all of the functionality of the DPM takes advantage of specific features or attributes of a particular manufacturer's or provider's storage device. Examples of the I/O policy functionality present in DPM 347 include path select procedures, failover procedures, load balance procedures, error detection procedures, and path probing and analysis procedures.

Module management 345 (shown as a separate software entity, but implementable as part of core functions 341) provides an interface to one or more DPMs loaded in DMP Driver 340. Just as the case with storage device attributes, information about various DPMs can also be stored in database 343. DPMs can come from respective device support libraries 333 or loaded from some other repository. DPMs can be loaded into DMP driver 340 as part of the normal configuration process, e.g., a device is discovered, its attributes determined, and information is provided to the DMP driver, or DPMs can be loaded upon specific request by an application such as application 320.

In order to monitor the state of SAN components, and to use this information to make proactive decisions about path selection, device discovery layer 331 includes event monitor 335. Although the functionality of event monitor 335 will be discussed in the context of device discovery layer 331, it should be noted that one or more aspects of the event monitor can be implemented as programs or threads of programs that are separate from the various modules illustrated, part of other modules illustrated (e.g., DMP driver 340) or some combination of the two. Event monitor 335 is shown with three components: HBA interface 336, DMP logging 337, and operating system (OS) event handler 338.

DMP logging 337 is used to receive event information from DMP driver 340. This information does not typically include specific information about SAN topology, but rather information and statistics about basic DMP operations, e.g., path failover occurrence, time for failover, SCSI Inquiry times, etc. This log of DMP events is particularly useful for system debugging. This information can be stored in any of a variety of data structures, e.g., databases, log files, and the like. Such data structures can be part of database 332, or some other data storage. Similarly, OS event handler 338 gathers information about various OS events that are related to device discovery and DMP functionality, e.g., OS device reconfiguration events. As with DMP logging 337, this information can be stored in a variety of different data structures and retained in various portions of system 300.

HBA interface 336 is an event monitoring component designed to interface with computer system 310's HBAs 360 and 361 to monitor SAN events, e.g., fiber channel events related to the SAN topology and, by extension, the paths used to implement DMP. HBA interface 336 also maintains a data structure describing the SAN topology. That data structure is used, by event monitor 335, device discovery layer 331, and/or DMP driver 340 to perform proactive functions in support of DMP. Although the examples of the present invention will emphasize SANs utilizing fibre channel protocols, those having ordinary skill in the art will recognize that the systems, software, devices, and techniques described in the present application can be extended to and implemented using other protocols, such as those for iSCSI, Infiniband, and the like.

In one embodiment, HBA interface 336 gathers information about fibre channel registered state change notification (RSCN) events. RSCN events generally occur in the SAN fabric whenever a change in the fabric occurs. This could mean a hard drive is added, removed, bypassed or re-inserted into a system, a host rebooted, or any other change in the topology. RSCN is intended to provide a timely indication of changes in nodes to avoid the considerable traffic that polling may generate. RSCN may be used to indicate a failed node, allowing the release of resources tied up by the failed node. It may also be used to notify interested nodes of new devices coming online, and of changes within an online node that affect the operation of the system (e.g., more storage has become available). Moreover, a sender of an RSCN "request" (i.e., the event notification) may coalesce several events into a single report. Thus, when a suitable event occurs, an RSCN message is sent to all the node devices in the same fabric zone (or, at least, those node devices in the same zone that have registered to receive such messages). RSCN messages can be sent by a fabric controller (e.g., a SAN switch) or by the affected device/port. The payload of an RSCN message includes a list containing the addresses of the affected devices or device ports. The RSCN message also includes a summary indication of the type of state change being reported to assist in analyzing the change. RSCN message contents and formats may change depending on the source, and can be expanded beyond current fibre channel specifications.

When properly registered, HBAs 360 and 361 will receive RSCN messages describing changes in the SAN. HBA interface 336 gathers this information from the HBAs using an application programming interface (API) specific to the HBA. In order to operate, upper level software applications require information that is not available from HBAs in a consistent manner across operating systems, vendors, and platforms, and in some cases not at all. In some cases, HBA vendors provide a proprietary API for interfacing with the HBA. In other cases, vendors have developed HBA APIs that conform to a common HBA API specified by the Storage Networking Industry Association (SNIA). This API provides a consistent low-level HBA standard interface for accessing information in a fibre channel SAN that would be implemented across vendors as a standard C language API supported by vendor specific library instances.

More specifically, at the upper level, a common HBA library provides the ability to handle multiple vendor implementations of the HBA API through dynamic loading of libraries. At the intermediate level, the functions of the common API invoke their respective functions in vendor-specific libraries provided by each HBA vendor. For the most part, there is a one to one correspondence between the functions of the common API library and the functions of the vendor specific libraries. Certain references will be made below to SNIA HBA API functions. However, these are merely examples. Various other APIs can be implemented and utilized depending on, for example, the HBA hardware being used, the underlying SAN protocols, etc.

As will be discussed in greater detail below in the context of FIG. 5, software such as HBA interface 336 integrates the HBA API so that it can gather RSCN information from the HBA, as well as probe the SAN and issue commands to various SAN devices.

In a typical implementation, some or all of the components of DMP driver 340 operate in a kernel portion of the host computer system 310's memory, while some or all of the components of device discovery layer 330 operate in a user portion of system memory. In general, the software components shown in FIG. 3 are divided into those components operating at the kernel level, and those operating at the user level, as is well known in the art. Kernel memory space is generally reserved for the computer operating system kernel and associated programs. Programs residing in kernel memory space typically have unrestricted privileges, including the ability to write and overwrite in user memory space. By contrast, programs residing in user space typically have limited privileges. Thus, depending on the implementation of DMP driver 340, DPM 347 can be a kernel module or a user space module. However, because of the nature of driver software, e.g., the need to interface with low-level portions of the operating system, the need to protect the driver from other programs, the handling of I/O operations, etc., DPMs are typically implemented as kernel modules. Moreover, various aspects of the functionality can operate as single threaded programs or multithreaded programs, either of which can be implemented as daemons. For example, in one embodiment, event monitor 335 is implemented as a multi-threaded daemon, having a thread each for each of HBA interface 336, DMP logging 337, and operating system (OS) event handler 338.

Figure 1:
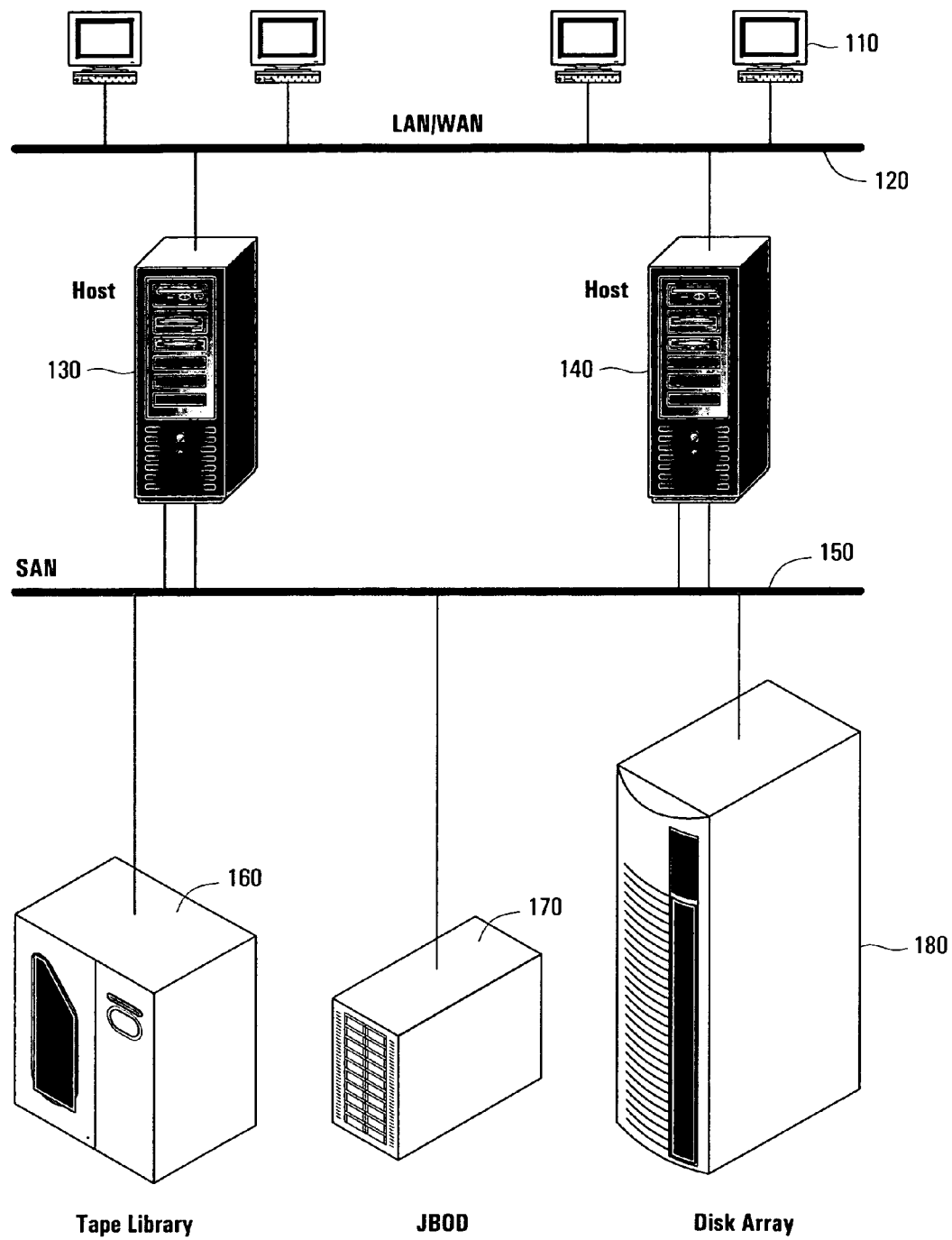
FIG. 1 is a simplified block diagram of a computing system.
Figure 2:
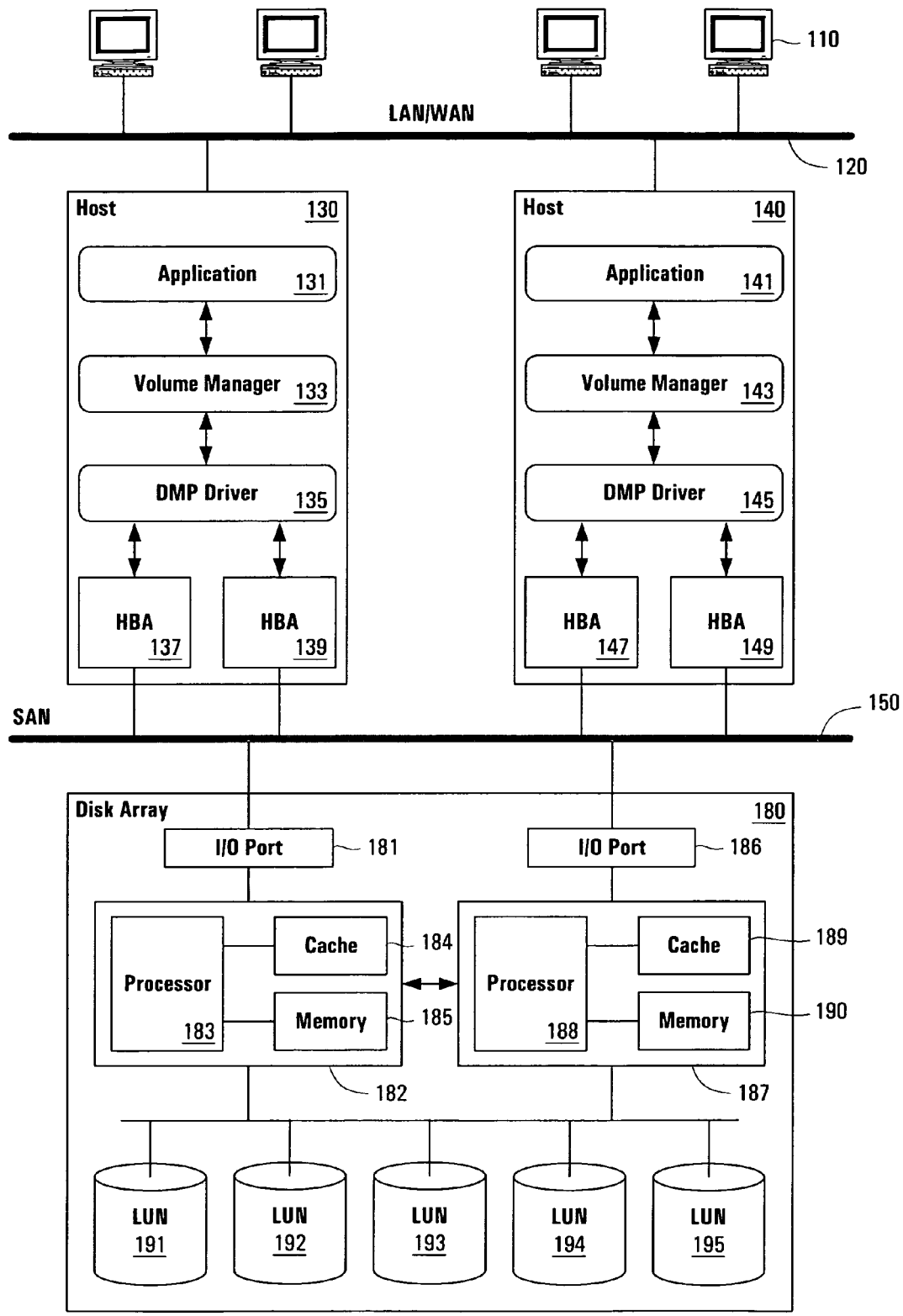
FIG. 2 is a simplified block diagram illustrating in greater detail several components of the computing system shown in FIG. 1.

Other system components illustrated in FIG. 3 function in a manner similar to corresponding components shown in FIG. 2. For example, host bus adapters 360 and 361 provide a hardware interface between the host bus of host computer system 310 and SAN 150. Various other drivers, e.g., storage device specific drivers, OS drivers, etc. are shown at 350 and 351. Although DMP driver 340, device discovery layer 331, and various related features have been described in the context of a standard host computer system, it should be noted that these features and functionality can be implemented in a variety of other architectures such as clustered computing systems and specialized storage devices (e.g., SAN switches, SAN routers, SAN hubs, or some type of storage appliance). Moreover, the present systems, methods, devices, and software can be implemented in conjunction with a variety of different virtualization schemes (e.g., host based, appliance based, storage based, in-band, out-of-band, etc.) and indeed with no virtualization scheme at all. Similarly, a variety of different storage devices, and indeed addressable storage objects generally, can be used in conjunction with the methods, devices, and software disclosed.

Figure 4A:
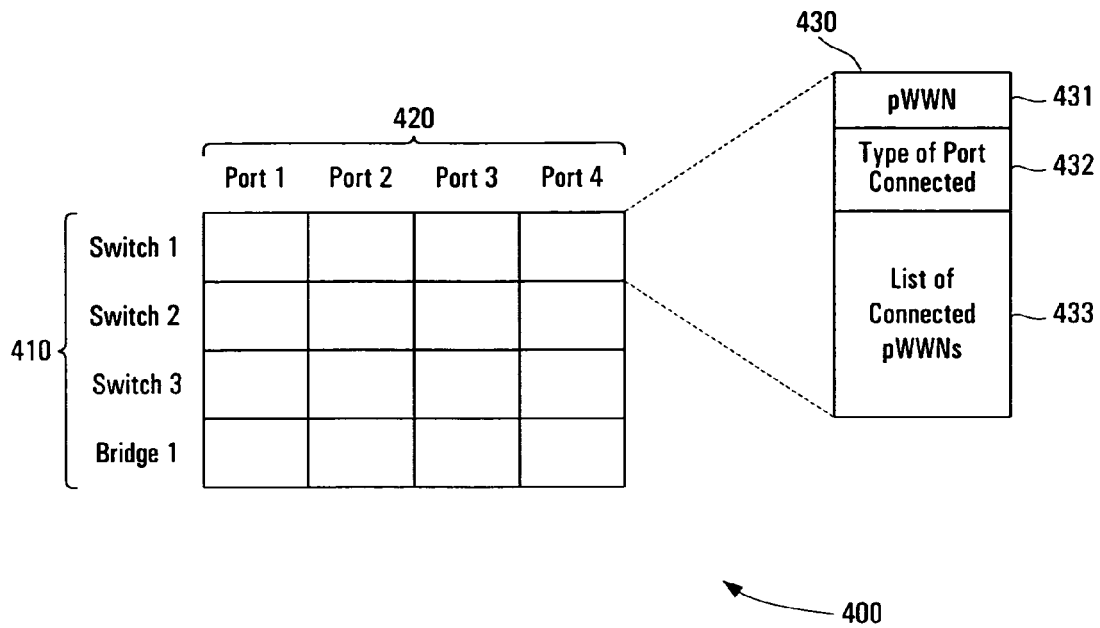
FIGS. 4A-4B illustrate several examples of SAN topology data structures.
Figure 4B:
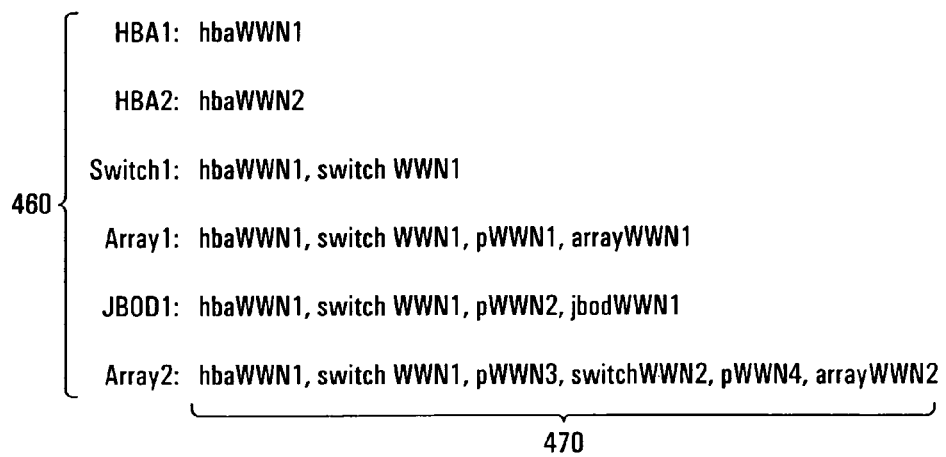

FIGS. 4A-4B illustrate several examples of SAN topology data structures. One or both of these structures can be maintained in support of the systems, software, devices, and techniques described in the present application. Moreover, various other data structures such as tables, trees, linked lists, graphs, and databases can be utilized.

In FIG. 4A, table 400 illustrates one way in which various SAN devices, corresponding ports, and their corresponding port types can be organized and tracked. Here, the SAN topology is represented using a two dimensional array. One dimension of the array (410) represents inter-connected elements (e.g., switches/bridges). Another dimension of the array (420) represents the list of ports that each switch/bridge has. Each element (430) in the two dimensional array has a world wide name (WWN), which is a 64-bit address used in fibre channel networks to uniquely identify each element in the network. Here, switch 1, port 4 is indicated as having a "pWWN" (431) as its WWN. The record can also include relevant port information such as the type of the port to which this port is connected (432) and a list of the one or more port WWNs to which this port has been connected. The type of port in this data structure will typically have values such as switch/bridge port, end point (e.g., HBA or LUN), etc. More specifically, port type information can include explicit fibre channel port type classifications. These port type designations include: (1) N_port: a node port, or a port on a disk or computer (these communicate only with other N_ports or to a switch; (2) F_port: a fabric port found on switches; (3) L_port: the "L" in a port name implies that it is a port that can participate in an arbitrated loop (e.g., NL_port, FL_port, etc.); (4) E_port: an expansion port on a switch that is used to connect to other switches via their E_ports to form a fabric; and (5) G_port: a generic port on a switch that can act as an E_port, an FL_port, or an F_port, depending on what connects to it.

FIG. 4B, illustrates a series of paths 450. This data structure can be maintained separately from table 400. In one embodiment, data structure 450 is built using information from table 400 as well as other information, such as information from the device discovery layer's database 332. In still other embodiments, data structure 450 is maintained instead of table 400. Data structure 450 is organized by specific device 460. For each such device, e.g., Array2, a complete list 470 is kept of all the devices in the path from the host to device. In this example, the list is kept in terms of the WWN corresponding to the device. Thus, the host's two HBAs (here designated HBA1 and HBA2) only have their own WWNs listed because there are no other intervening devices. The path to other devices can be more complex, and thus various switch, bridge, hub, port, or storage device WWNs might be included.

In either example, SAN topology is initially ascertained, stored, and updated as changes occur in the SAN. This information can then be used to make more intelligent decisions related to failure analysis, e.g., path failover, marking suspect paths, and the like.

Figure 5:
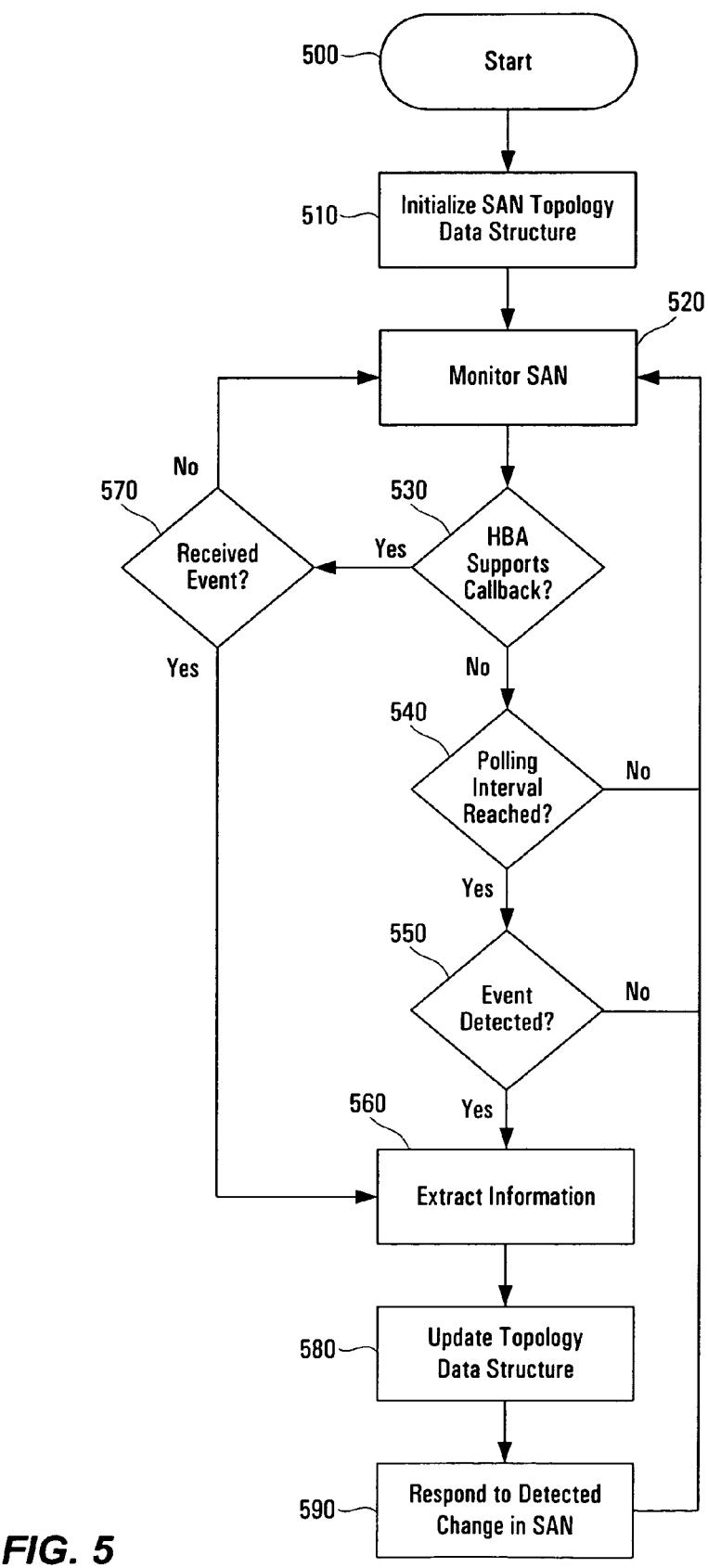
FIG. 5 is a flow chart illustrating techniques of the present invention.

Operation of systems and methods for gathering and using SAN topology information are illustrated in FIG. 5. In particular, a process of building and using a SAN topology data structure is shown at 500.

In step 510, the SAN topology data structure is initialized. This can include a number of sub-operations including, for example, functionality verification, data structure initialization, and gathering initial data about the SAN. The initialization process can begin with verification that the HBA API library in use is available in the host computer system. Since this directly impacts both initial gathering of topology information and subsequent monitoring of SAN events (e.g., via RSCN messages), unavailability of certain HBA API function may require the entire operation to be aborted. Moreover, if HBAs from two different vendors are present in the host system, then separate APIs for both may be needed. Once this is confirmed the appropriate processes/threads can be started.

Another component of operation 510 is the initial population of the SAN topology data structure(s). Data about the various SAN devices, e.g., WWNs, connectivity information, status information, etc., is gathered via calls to the HBA API. In the case of the aforementioned SNIA HBA API, a call can be made to the HBA_SendCTPassThru interface. A call to this function send a common transport (CT) pass through frame. In this case CT refers to an instance of the common transport protocol through which device services are accessed. An HBA should decode this request, routing the CT frame in a fabric according to information within the CT frame. For example, using HBA_SendCTPassThru the software (e.g., event monitor 335) can send command packets to the HBA to access fibre channel generic services (FC-GS). Using FC-GS, the software can get a list of inter-connected elements (e.g., switches, bridges, hubs) in the SAN. With that information, each returned device can be queried to provide a list of its ports. Each port can be queried to get the attached port names list, port type information, and the like. Using this information, the data structure describing the SAN topology can be populated. After collecting initial the topology information, the software can use another function to collect mapping information between device names and WWNs. For example, the HBA_GetFcpTargetMapping interface can be used to collect the mapping between OS identification of SCSI logical units and fibre channel identification of logical units. Still other API functions can be used to gather device information. For example, the functions HBA_GetAdapterAttributes, HBA_GetAdapterPortAttributes, and HBA_GetDiscoveredPortAttributes can be used to determine the exact source and destination WWN of each path. With this information, end devices within the topology are identified, and these devices can be mapped to port WWN.

If the HBA is not already registered to receive certain messages and events, the software causes the HBA to become registered within the SAN. Although RSCN messages/events are emphasized in the present description, registration can occur for various other fibre channel events or other protocol events (where different protocols are used in the SAN). Additionally, the software can register with the HBA so as to receive message/event information. For example, the functions HBA_RegisterForAdapterEvents, HBA_RegisterForLinkEvents, HBA_RegisterForAdapterAddEvents, HBA_RegisterForAdapterPortEvents, and HBA_RegisterForTargetEvents are used to register callbacks for events. In the case of callbacks, the HBA will forward event information directly to the software so registered. HBA_RegisterForAdapterEvents causes registration for asynchronous adapter level events. When an adapter level event occurs, the callback function is called with a suitable event type and event information. Event delivery can be terminated by a call to HBA_RemoveCallback. Similarly, HBA_RegisterForLinkEvents registers a specified adapter for asynchronous fabric link events. When a fabric link level event is detected by the adapter, the callback function is called, and appropriate event information is passed back. Various registrations can occur for callbacks associated with specific events or event types.

A callback interface is useful in many cases because the monitoring software does not have to poll the HBA at periodic or random intervals, i.e., the information is pushed to the software once it is received by the HBA. If callback is not supported, a polling interface can be used. For example, HBA_GetEventBuffer can be used to collect the events. If this is the case, a suitable timer can be implemented to poll for events at specified intervals, e.g., 15 seconds. The interval can be selected to be less than other timeout intervals, e.g., SCSI timeouts that are 30 or 60 seconds. Moreover, quick identification of SAN topology changes is generally desirable, so relatively short intervals may be used.

Thus, once initialization is complete, operation transitions to 520 where the SAN is monitored. If an HBA supports callback, as determined in 530, operation transitions to 570. Here, if the HBA has received an event, operation transitions to 560 where event information is extracted. If the HBA does not support event callback (or if polling was specifically selected as the information gathering mechanism) operation transitions to 540. Here, a determination is made whether the polling interval has been reached. This interval is generally selected to be short enough to catch changes in a timely fashion, but long enough so that the software and HBA are not burdened with unnecessary polling requests. If the interval has not been reached, operation returns to 520. If it has been reached, operation proceeds to 550. Here, the HBA is queried to determine if it is storing event information. If so, that information is extracted (560) and if not, the process returns to 520.

Once the monitoring software receives/extracts event related information, that information is used to updated the SAN topology data structure 580. For example, if the monitoring software receives and RSCN event from a specific port in the fabric, then by looking at the topology data structure, the software will determine which paths that are going to be affected. Next, some response is taken in light of the topology change (590). That response can take various forms. In some instances, the topology change is not significant enough for proactive steps related to DMP or other software functionality. That is, no response will be taken. In other instances, the monitoring software will inform DMP functionality so that it can probe the affected paths to update their status. This subsequent probing, or the SAN topology information itself, can trigger corrective action such as path failover, marking certain paths as suspect, warning system operators, and the like. If the DMP functionality determines that a particular path has failed or should not be used, it can, in turn, extract alternate path information from the SAN topology data structure, or request that the monitoring software provide it with alternate path information. For example, SAN topology information can be used to determine non-overlapping paths (i.e., paths that do not include the point of change/failure). These paths can be analyzed or used first for possible failover. In general, DMP functionality (wherever it is implemented) can use the acquired SAN topology information to take some corrective action. Once the SAN topology change is responded to, operation returns to 520.

The flow chart of FIG. 5 illustrates some of the many operational examples of the SAN topology monitoring techniques disclosed in the present application. Those having ordinary skill in the art will readily recognize that certain steps or operations illustrated in FIG. 5 can be eliminated or taken in an alternate order. Moreover, the methods described in FIG. 5 and many of the modules illustrated in FIG. 3 are typically implemented as one or more software programs for a computer system and are encoded in a computer readable medium as instructions executable on one or more processors. The computer readable medium can be one or more of an electronic storage medium, a magnetic storage medium, an optical storage medium, or a communications medium conveying signals encoding the instructions. Separate instances of these programs can be executed on separate computer systems in keeping with the multi-process methods described above. Thus, although certain steps have been described as being performed by certain devices, software programs, processes, or entities, this need not be the case and a variety of alternative implementations will be understood by those having ordinary skill in the art.

Additionally, those having ordinary skill in the art will readily recognize that the techniques described above can be utilized in a variety of different storage devices and computing systems with variations in, for example, the number of nodes, the type of operation of the computing system, e.g., cluster operation (failover, parallel, etc.), the number and type of shared data resources, and the number of paths between nodes and shared data resources.

Figure 6:
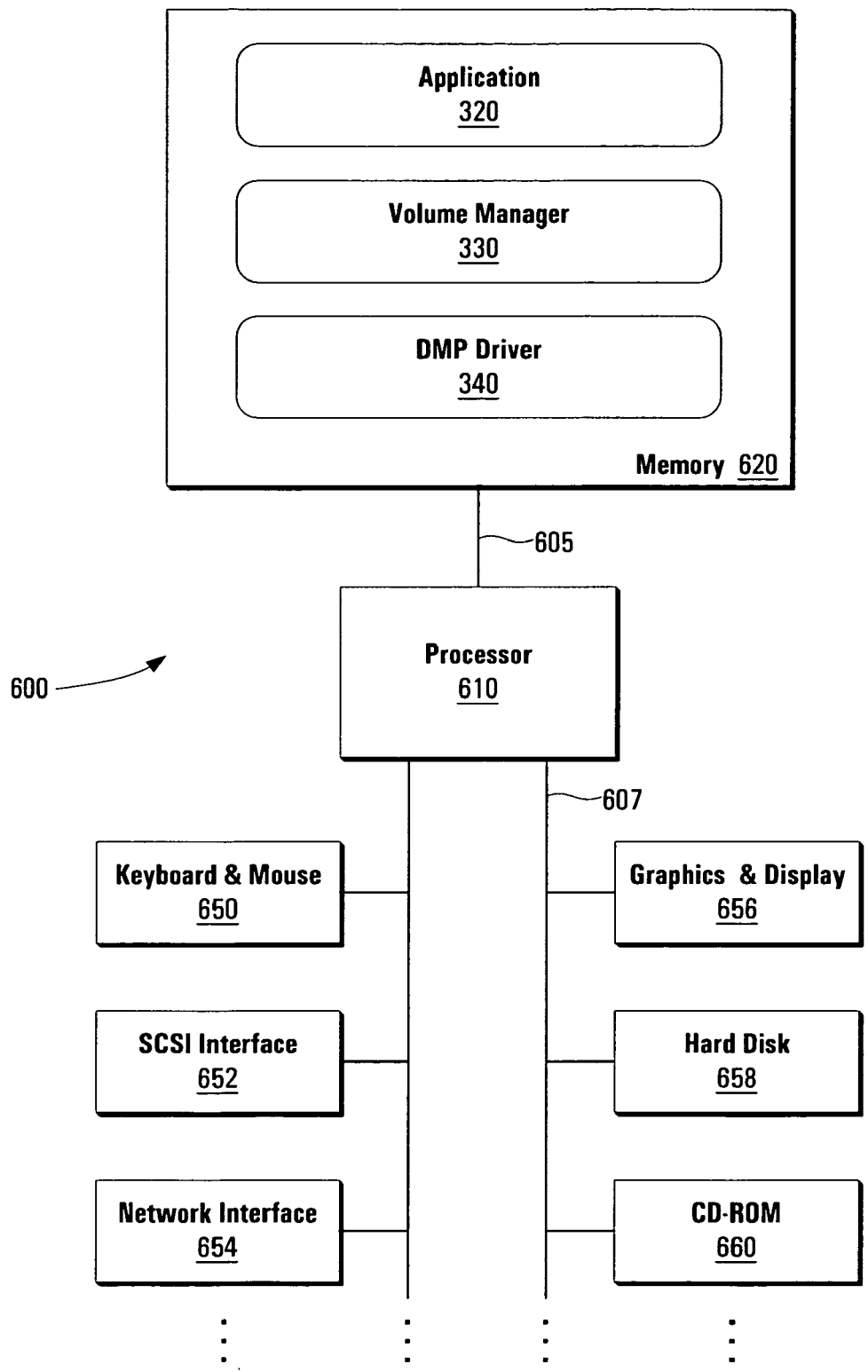
FIG. 6 is a block diagram of a computer system for implementing the techniques of the present invention.

FIG. 6 illustrates a block diagram of a computer system 600 for implementing the SAN topology discovery and failure analysis techniques of the present application. For example, computer system 600 can be an embodiment of one of the previously described cluster nodes. Computer system 600 includes a processor 610 and a memory 620 coupled together by communications bus 605. Processor 610 can be a single processor or a number of individual processors working together. Memory 620 is typically random access memory (RAM), or some other dynamic storage device, and is capable of storing instructions to be executed by the processor, e.g., application 320, volume manager 330, and DMP driver 340. Memory 620 is also used for storing temporary variables or other intermediate information during the execution of instructions by the processor 610.

Those having ordinary skill in the art will readily recognize that the techniques and methods discussed below can be implemented in software using a variety of computer languages, including, for example, traditional computer languages such as assembly language, Pascal, and C; object oriented languages such as C++, C#, and Java; and scripting languages such as Perl and Tcl/Tk. Additionally, software 320, 330, and 340 can be provided to the computer system via a variety of computer readable media including electronic media (e.g., flash memory), magnetic storage media (e.g., hard disk 658, a floppy disk, etc.), optical storage media (e.g., CD-ROM 660), and communications media conveying signals encoding the instructions (e.g., via a network coupled to network interface 654).

Computer system 600 also includes devices such as keyboard & mouse 650, SCSI interface 652, network interface 654, graphics & display 656, hard disk 658, and CD-ROM 660, all of which are coupled to processor 610 by communications bus 607. It will be apparent to those having ordinary skill in the art that computer system 600 can also include numerous elements not shown in the figure, such as additional storage devices, communications devices, input devices, and output devices, as illustrated by the ellipsis shown. An example of such an additional computer system device is a fibre channel interface.

Although the present invention has been, in some cases, described is in terms of providing support for multipath disk arrays, the present invention can also be used to support disk arrays having only a single path. Multipath disk arrays are used to illustrate the usefulness of the invention, although one of skill in the art will recognize that the invention is not limited to support for multipath disk arrays. In contrast, the present invention can be used in conjunction with a variety of different types of storage devices including discrete disks, solid state storage devices (including flash memory), storage appliances, and other storage devices.

Loadable module techniques as described herein can also be applied to other remote device access technologies. For example, standard protocols, e.g., the SCSI protocol, can be extended to provide some common functionality in different ways, or manufacturers may disagree on some interpretation aspects of a standard and provide different behaviors in their devices. Consequently, the loadable module techniques provide extensible, polymorphic, uniform mechanisms for accessing this non-standard but common functionality or for providing specific handling for different behaviors that cannot be efficiently handled by common code. Using simple type-specific loadable modules with a set of attributes and functionality handlers, allows accommodation of unusual new devices without having to change established products. Moreover, one can rely on either a storage device vendors of such a new device or on storage management software vendors to provide the module to handle this new device. This technique generally has broad application and can also be used, for example, to access extended protocol mechanisms using protocols other than the block access protocols like SCSI.

Although the present invention has been described with respect to a specific preferred embodiment thereof, various changes and modifications may be suggested to one skilled in the art and it is intended that the present invention encompass such changes and modifications fall within the scope of the appended claims.

What is claimed is:

1. A method comprising:
creating a storage area network (SAN) topology data structure using data comprising SAN device connectivity information, and SAN device status information, wherein the data is gathered via calls to a host bus adapter (HBA);
loading a module into a multipath device driver, wherein the module comprises device-specific procedures augmenting an existing set of general procedures, and the module is specific to one of a plurality of devices within a SAN topology;
receiving, at the HBA, a message indicating occurrence of an event related to a change in the SAN topology;
obtaining, from the HBA, information from the received message, wherein the information describes a change in a SAN device;
updating the SAN topology data structure according to the information from the received message;
using information in the updated SAN topology data structure to identify a suspect path for use by the multipath device driver; and
selecting, using the updated SAN topology data structure, a path different from the suspect path, wherein the selecting is based in part on the module loaded into the multipath device driver.

2. The method of claim 1 wherein the message is generated in response to a failure of a SAN component.

3. The method of claim 1 wherein the message is a registered state change notification (RSCN) message.

4. The method of claim 1 further comprising:
causing the HBA to register with one or more of the SAN device or another SAN device in order to receive the message.

5. The method of claim 1 further comprising:
polling the HBA at one of a periodic interval and an arbitrary interval to determine if the HBA has received the message.

6. The method of claim 1 further comprising:
requesting that the HBA send the information from the received message to a software process in response to the receiving.

7. The method of claim 1 further comprising:
registering with the HBA using an application programming interface (API).

8. The method of claim 1 wherein the event related to a change in topology comprises one or more of: a device failure, addition of a device, a connection failure, or a device status change.

9. The method of claim 1 wherein the SAN topology data structure further comprises:
a table describing SAN devices and corresponding ports.

10. The method of claim 1 wherein the SAN topology data structure further comprises:

at least one path between a host device and the SAN device, wherein the at least one path describes a plurality of components coupled between the host device and the SAN device.

11. The method of claim 1 wherein the selecting is performed by one of:
the multipath device driver, or
an event monitor.

12. The method of claim 1 wherein the using information in the SAN topology data structure to identify the suspect path for use by the multipath device driver further comprises:
probing the suspect path.

13. The method of claim 11 wherein the using information in the SAN topology data structure to identify the suspect path for use by the multipath device driver further comprises:
flagging the suspect path.

14. The method of claim 1 wherein the multipath device driver performs one or more of:
selecting one of a plurality of communication pathways to at least one storage device;
selecting one or more sub-devices of the at least one storage device which will be affected due to a communication pathway failure;
selecting an alternate communication pathway in case of a failure of one of the plurality of communication pathways;
changing a current communications pathway from a first one of the plurality of communication pathways to a second one of the plurality of communication pathways; or
selectively transmitting I/O operations along at least two of the plurality of communication pathways to the at least one storage device.

15. The method of claim 1 further comprising:
requesting a list of interconnected devices in the SAN;
receiving the list of interconnected devices in the SAN; and
updating the SAN topology data structure according to the received list of interconnected devices in the SAN.

16. The method of claim 15 further comprising:
querying at least one device from the list of interconnected devices in the SAN for a list of device ports;
receiving the list of device ports; and
updating the SAN topology data structure according to the received list of device ports.

17. The method of claim 16
querying at least one device port from the list of device ports for one or more of an attached port names list or port type information;
receiving the one or more of the attached port names list or port type information; and
updating the SAN topology data structure according to the one or more of the attached port names list or the port type information.

18. A system comprising instructions stored in a memory device, wherein the instructions are configured to:
create a storage area network (SAN) topology data structure using data comprising SAN device connectivity information, and SAN device status information, wherein the data is gathered via calls to a host bus adapter (HBA);
load a module into a multipath device driver, wherein the module comprises device-specific procedures augmenting an existing set of general procedures, and the module is specific to one of a plurality of devices within a SAN topology;
obtain, from the HBA coupled to the processor and coupled to a SAN, information about a change in the SAN topology;
update the SAN topology data structure according to the information about the change in SAN topology;
direct input/output (I/O) operations along at least one of a plurality of communication pathways of the processor to at least one storage device in the SAN,
use information in the SAN topology data structure to identify a suspect path of the plurality of communication pathways, and
select a path of the plurality of communication pathways different from the suspect path, based on the updated SAN topology data structure, wherein the path is selected based in part on the module loaded into the multipath device driver.

19. The system of claim 18 further comprising:
the host bus adapter configured to:
receive the information about the change in topology of the SAN from a device in the SAN; and
store the information about the change in topology of the SAN.

20. The system of claim 19 wherein the host bus adapter is further configured to automatically send the information about the change in topology of the SAN to an event monitor.

21. The system of claim 19 wherein the event monitor is further configured to request the information about the change in topology of the SAN from the host bus adapter.

22. The system of claim 19 wherein the host bus adapter is further configured to register with the device in the SAN in order to receive the information about the change in topology of the SAN.

23. The system of claim 18 wherein the information about the change in topology of the SAN is from a registered state change notification (RSCN) message.

24. The system of claim 18 wherein the SAN topology data structure further comprises:
a table describing SAN devices and corresponding ports.

25. The system of claim 18 wherein the SAN topology data structure further comprises:
at least one path between a host device and a SAN device, wherein the at least one path describes a plurality of components coupled between the host device and the SAN device.

26. The system of claim 18 further comprising:
a memory; and
a processor coupled to the memory, wherein one or more of an event monitor or the multipath device driver are encoded as instructions stored in the memory and executable on the processor.

27. The system of claim 18 wherein the multipath device driver is further configured to do one or more of:
probe the suspect path; or
flag the suspect path.

28. A computer readable storage medium comprising program instructions executable on a processor, the computer readable medium encoding the program instructions, wherein the program instructions are operable to implement each of:
creating a storage area network (SAN) topology data structure using data comprising SAN device connectivity information, and SAN device status information, wherein the data is gathered via calls to a host bus adapter (HBA);
loading a module into a multipath device driver, wherein the module comprises device-specific procedures augmenting an existing set of general procedures, and the module is specific to one of a plurality of devices within a SAN topology;

obtaining, from the HBA, information about a change in the SAN topology;

updating the SAN topology data structure according to the information about the change in SAN topology;

using information in the updated SAN topology data structure to identify a suspect path for use by the multipath device driver; and selecting a path different from the suspect path, wherein the selecting is based in part on the module loaded into the multipath device driver.

29. The computer readable storage medium of claim 28 further comprising program instructions operable to:

cause the host bus adapter to register with at least one SAN device in order to receive the information about the change in topology of the SAN.

30. The computer readable storage medium of claim 28 further comprising program instructions operable to:

poll the host bus adapter at one of a periodic interval and an arbitrary interval to determine if the host bus adapter has received a message.

31. The computer readable storage medium of claim 28 further comprising program instructions operable to:

request that the host bus adapter send the information about the change in topology of the SAN to a software process when the host bus adapter receives the information about the change in topology of the SAN.

32. The computer readable storage medium of claim 28 wherein the SAN topology data structure further comprises one or more of:

a table describing SAN devices and corresponding ports; or at least one path between a host device and a SAN device, wherein the at least one path describes a plurality of components coupled between the host device and the SAN device.

33. The computer readable storage medium of claim 28 further comprising program instructions operable to one or more of:

probe the suspect path; or flag the suspect path.

\* \* \* \* \*